Patented June 29, 1948

2,444,117

UNITED STATES PATENT OFFICE 2,444,117

REEL AND CUTTER DEVICE

Nathan Sloane and Max Sloane, Brooklyn, N. Y.

Application May 15, 1946, Serial No. 669,926

4 Claims. (Cl. 164—84.5)

This invention relates to devices comprising spools, reels, or the like, and to means adapted to be associated therewith for cutting the material that is being unwound from such spools or reels.

Heretofore such devices have been provided in which the blade was stationary and was carried by a support mounting a rotatable reel or spool. However, there are a great many devices used without any special support for the spool or reel, in consequence of which it was not possible to associate therewith a blade which would cut the unwound material at any desired point so as to obtain the length required.

It is accordingly an object of the invention to provide improved means adapted to be mounted directly upon a spool or reel in revoluble relation thereto, without requiring any special construction or change in the spool or reel, and whereby the material that is being unwound can be cut at any desired point.

Another object of the invention is the provision of a small and highly compact device comprising a spool or reel and a cutter for the material wound thereon, directly operatively mounted on the spool or reel as by a spring or snap action.

Another object of the invention is to furnish a device of the character described having improved means whereby the motion of the cutter can be easily arrested without danger of cutting one's hand or soiling the material, such as adhesive sanitary tape that is being unwound.

Reels for sanitary adhesive tape have generally had various indicia imprinted upon the sides thereof, and are furnished with a closure consisting of a snap ring receiving the reel.

It is therefore another object of the invention to furnish a device of the nature set forth including improved means such that the mounting of the cutter shall not interfere with the mounting of the closure ring, and preferably also shall not score or obliterate the marking or legend on the sides of the reel.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

Figure 1:
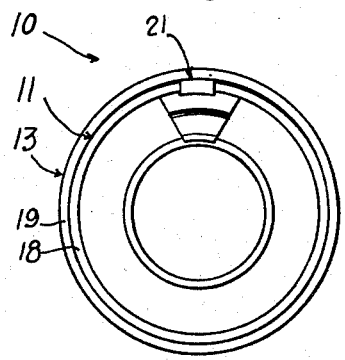
Figure 1 is a view in side elevation showing a device embodying the invention as illustrated in a conventional reel and its ring covered assembly therewith.
Figure 2:
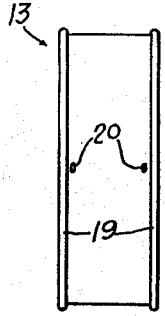
Fig. 2 is a view in end elevation thereof.
Figure 3:
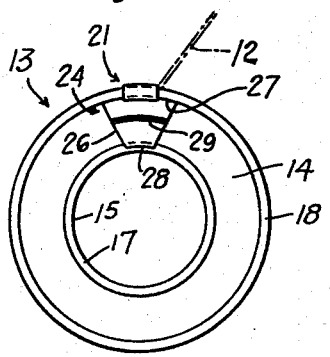
Fig. 3 is a view in side elevation of the reel with the invention applied thereto, but with the ring cover removed and showing in dot-dash lines a piece of material that is being unwound and cut.
Figure 4:
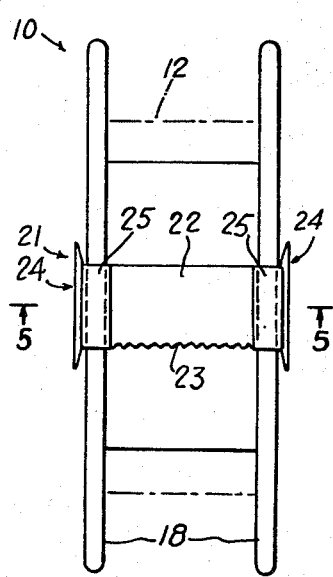
Fig. 4 is an enlarged view in end elevation of the device with the wound material on the reel illustrated in dot-dash lines.
Figure 5:
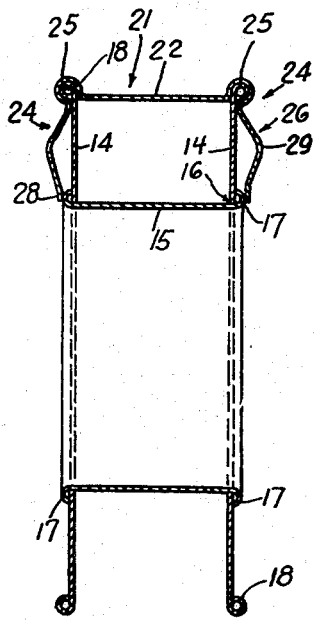
Fig. 5 is a sectional view taken on the line 5—5 of Fig. 4.
Figure 6:
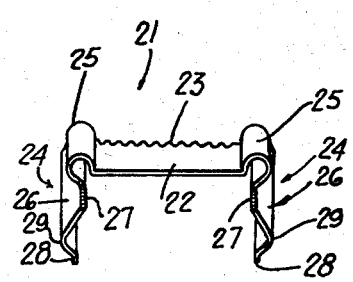
Fig. 6 is a perspective view of the new article of manufacture embodying the invention, separate of the reel.
Figure 7:
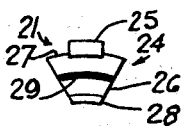
Fig. 7 is a side view of the attachment.

The advantages of the invention as here outlined are best realized when all of its features and instrumentalities are combined, but useful embodiments may be produced involving less than the whole.

It will be obvious to those skilled in the art to which the invention appertains, that the same may be incorporated in several different constructions. The accompanying drawing, therefore, is submitted merely as showing a preferred exemplification of the invention.

Referring in detail to the drawing, 10 denotes a device embodying the invention. The same may include a spool 11, illustratively shown as a reel of a conventional type generally used for sanitary adhesive tape 12. This reel is generally provided with a ring shaped cover 13 to protect the tape.

Without being limited thereto, it may be mentioned that the reel 11 provides walls 14 which may be suitably secured on a ring-shaped hub 15 received in holes 16 of the walls in which the hub may be press-fitted, the latter being upwardly beaded at 17 to retain the walls. At their outer peripheries, the walls 14 are outwardly beaded at 18. The reel thus constitutes a light and simple structure which is smooth and uniform at all points. It is customary to imprint various indicia or legends on the outer faces of the walls 14 descriptive of the adhesive tape 12 which is wound around the hub 15. The cover 13 is of cylindrical shape and may have its edges outwardly beaded at 19. This cover may frictionally sit on the walls 14 or it may be retained therein by a snap action which is afforded by the indentations 20 pressed inwardly in the cover and adapted to engage the heads 18.

The invention includes the new article of manufacture, namely, severing attachment 21, preferably formed as a one piece structure of resilient or other suitable material. It may include a blade portion 22, one of whose edges is sharpened or serrated as at 23 to facilitate cutting of the tape or other material that is wound around a spool or reel. At its opposite ends are formed the identical means 24 for operatively mounting the blade portion on the reel or spool. For application to the reel 11, each of the means 24 may include an open bead-like element or guide or socket 25, adapted to receive and snugly engage a peripheral rail 18 of the reel. Thus the portions 18 form a circular track along which the attachment 21 is adapted to travel in an endless path, whereby the blade portion 22 is revoluble about the axis of the reel while being maintained in operative relation thereto. Depending from the guides 25 are the wings 26, these being substantially wider than the blade portion 22 and having upper arcuate edges 27 slidingly engaging the inner faces of the bead-like portions 18 to increase the stability of the attachment 21. At their lower ends, the wings 26 may engage the hub 15 at any suitable points thereof to add to the securement or riding quality of the attachment 21. For the present purposes, it is sufficient that the end portions 28 shall merely slide along the outer faces of the beads or edge rim 17 to prevent them from contacting the walls 14 and marring or scoring the printing thereon. Intermediate of the portions 27 and 28, the wings 26 are outwardly bowed at 29 to afford finger grip portions whereby the attachment may be pressed and clamped against the sides of the reel to arrest the travel of the attachment at a point where the unwound material is to be severed. If the attachment consists of spring material, it may be readily snapped on to the reel 11, with the guides 25 expanding to receive the rail portions 18 whereupon the attachment is fully operatively mounted as shown. If nonresilient material is used, the attachment may be formed and then pressed on to the reed by pinching the portions 25 thereon. The attachment may of course be made of metal, plastic, or any other suitable material.

With the attachment 21 operatively mounted upon a reel to produce the novel combination and arrangement of the invention, the ring cover 13 can be applied and snapped into position in the usual manner. Because the blade portion 22 is downwardly offset relative to the guides 25, it will form no obstruction to the cover, and because the guides 25 consist of rather thin material there will be no interference with the cover which is generally slightly larger than the reel to facilitate the snap engagement, and is consequently adapted to clear the guides 25.

In use, the operator removes the cover 13, and then unwinds the adhesive tape 12 while holding the reel on a finger inserted into the hub 15. The latter being smooth and unobstructed by the attachment 21, the reel is free to spin to facilitate unwinding. While this is occurring, the tape exerts a force against the cutting edge 23 of the attachment to propel and move the latter along the rack 18. In this operation, the edge will not cause premature cutting of the tape because it is not too sharp, or because the attachment may ride relatively freely and with little friction. During this travel or revolution of the attachment relative to the reel, the attachment remains in constant relation to the hand of the operator so that the attachment may be instantly pinched together at the wings 26 to arrest its further movement as well as rotation of the reel, whereupon the tape may be severed by the blade portion 22. This novel operation constitutes an essential feature of the invention.

The invention thus provides an attachment, or a reel or spool combined therewith, with the attachment mounted upon the reel or spool for revolution about the axis thereof as the material is being unwound so that such material may be cut at any desired point, and the material preferably propelling the attachment along its path of travel if the reel or spool is of the type that may be spun about a finger of the operator, until such time as the latter may conveniently arrest the further relative movement of the attachment to instantly sever the material. More specifically, the invention provides a reel or spool having a peripheral guide portion adapted by cooperation with the attachment to form an endless track for revolution of the latter about the axis of the reel or spool, desirably with supplemental means affording sufficient bearing engagement with the peripheral portion to prevent any tendency of tilting and consequent binding of the attachment with the peripheral portion, and preferably with the provision of lateral clamping sections to arrest the travel of the attachment. Such mounting may be sufficiently secured at the peripheral portion not to require securement of the attachment in the central opening or hub of the spool or reel, thereby facilitating the mounting of the attachment and leaving the central opening unobstructed for the spinning of the spool or reel about the finger of the operator.

We claim:

1. As a new article of manufacture, a severing attachment adapted to be mounted on a tape carrying spool, said attachment characterized as being a one-piece substantially U-shaped member having an intermediate flat cutting blade, socket guides formed on opposite ends of said blade, and bowed resilient wings extending from each of said guides, said wings being outwardly curved and terminating in flat free ends.

2. In a spool of the character described having spaced side walls provided with annular bead-like portions along peripheries thereof and a center ring having side flanges formed with edge rims extending laterally outwardly beyond said side walls, a severing attachment mounted on said bead-like portions for cutting strip material being unwound from the spool at any point thereof, said attachment being a one-piece substantially U-shaped member having a cutting blade, socket guides embracing the bead-like portions and slidably retained thereto, and wings formed to move at a spaced distance from said side walls extending from each of said guides, said wings resiliently clamping the ends thereof against said flange edge rims.

3. A severing attachment of the character described adapted to be mounted on a tape carrying spool having a bead-like peripheral portion comprising an intermediate cutting blade, socket guides integrally formed with said blade on each end thereof for slidingly retaining the blade on said spool bead-like portion, outwardly bowed wings integrally formed with each of said guides positioned to lie in a direction substantially perpendicular to said blade to form projecting finger gripping means, said wings terminating in ends for frictional contact with an outer surface of the spool.

4. A spool of the character described having spaced side walls provided with annular bead-like portions along peripheries thereof and a center ring having side flanges formed with edge rims extending laterally outwardly beyond said side walls, a severing attachment slidably mounted on said bead-like portions for cutting strip material being unwound from the spool at any point thereof, said attachment being a one-piece substantially U-shaped member having an intermediate cutting blade, socket guides formed on opposite ends of said blade embracing the bead-like portions and slidably retained thereto, and wings extending from said guides, said wings being bowed outwardly from said walls to form projecting finger gripping means so contructed and arranged to frictionally engage said flange edge rims for retaining said blade in fixed relation to the spool during cutting of said material.

NATHAN SLOANE.
MAX SLOANE.

REFERENCES CITED

The following references are of record in the file of this patent:

UNITED STATES PATENTS

| Number | Name | Date |
|---|---|---|
| 2,035,180 | Miller | Mar. 24, 1936 |
| 2,203,073 | Anderson | June 4, 1940 |
| 2,284,807 | Donahoo | June 2, 1942 |